United States Patent Office 3,491,087
Patented Jan. 20, 1970

3,491,087
AZETIDINE COMPOUNDS
John Frederick Cavalla, Isleworth, and Derek Charles Bishop, Turnford, near Broxbourne, England, assignors to Parke, Davis & Company, Detroit, Mich., a corporation of Michigan
No Drawing. Continuation-in-part of application Ser. No. 637,338, May 10, 1967. This application Oct. 11, 1967, Ser. No. 674,642
Int. Cl. C07d 25/00; C07c 101/18; A61k 27/00
U.S. Cl. 260—239                                 5 Claims

ABSTRACT OF THE DISCLOSURE 1-methyl- and 1 - phenethyl - 3 - (m-hydroxymethyl)-3-alkylazetidines; lower alkyl ethers and lower alkanoyl esters; and salts of the foregoing compounds. The compounds have pharmacological activity and can be produced by (a) substituting an azetidine compound at the nitrogen atom by reacting with a methylating agent or phenethylating agent, (b) converting a phenolic ether to a phenol by reacting with an acidic reagent, or (c) converting a phenol to a phenolic ester by reacting with a lower alkanoic acid or a reactive derivative.

CROSS REFERENCE TO RELATED APPLICATION

This is a continuation-in-part of our co-pending application Ser. No. 637,338, filed May 10, 1967, now abandoned.

SUMMARY AND DETAILED DESCRIPTION

The present invention relates to new azetidine compounds. More particularly, the invention relates to new N-substituted 3-aryl-3-alkylazetidine compounds of the formula

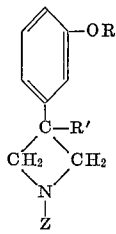

to salts thereof, and to methods for the production of the foregoing compounds; where R represents hydrogen, lower alkyl, or lower alkanoyl; R' represents an alkyl radical containing either 3 or 4 carbon atoms; and Z represents methyl or phenethyl ($C_6H_5CH_2CH_2$—). When R represents lower alkyl, it is an alkyl radical of not more than 4 carbon atoms, preferably methyl. When R represents lower alkanoyl, it is an alkanoyl radical of not more than 4 carbon atoms, preferably acetyl. Preferred compounds of the invention are those in which R' represents n-propyl or n-butyl.

In accordance with the invention, the compounds of the foregoing formula and their salts can be produced by reacting an azetidine compound having in free base form the formula

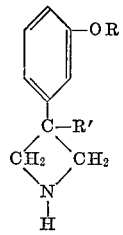

with a methylating agent or a phenethylating agent; where R represents hydrogen, lower alkyl, or lower alkanoyl; and R' represents an alkyl radical containing either 3 or 4 carbon atoms. However, for high yields and in order that competing side-reactions are minimized, best results in this process are obtained when R represents lower alkyl or lower alkanoyl. Some examples of suitable methylating agents are methyl halides, dimethyl sulfate, methyl p-toluenesulfonate, and formaldehyde-formic acid mixtures. Some examples of suitable phenethylating agents are phenethyl halides, preferably phenethyl bromide or phenethyl chloride. The azetidine compound and the methylating agent or phenethylating agent can be employed in approximately equimolar quantities although, except where R represents hydrogen, it is desirable to employ up to a moderate excess of the methylating agent or phenethylating agent.

The choice of the methylating agent or phenethylating agent determines, in part, the preferred reaction conditions. When formaldehyde-formic acid mixtures are used as the methylating agent, an excess of formic acid commonly serves as a solvent and an additional solvent is not needed. An excess of formaldehyde is avoided in those cases where the starting material is a free phenol, that is, where R represents hydrogen. When the methylating agent or phenethylating agent is a halide, sulfate, or sulfonate, the reaction is preferably carried out in the presence of a base such as potassium carbonate, sodium carbonate, or sodium bicarbonate and any of a variety of unreactive solvents is used. Some examples of suitable solvents are hydrocarbons such as benzene, toluene, and xylene; ethers such as diethyl ether, dioxane, tetrahydrofuran, and diethylene glycol dimethyl ether; lower alkanols such as methanol and isopropyl alcohol; lower aliphatic ketones such as acetone and methyl ethyl ketone; and tertiary amides such as dimethylformamide and N-methyl-2-pyrrolidone.

The time and temperature of the reaction are not critical and it is customary to carry out the reaction at room temperature, that is, about 15 to 25° C., for up to about 24 hours; or at temperatures up to about 150° C. with shorter reaction times. The optimum time and temperature are determined, in part, by the specific methylating agent or phenethylating agent used. When using formaldehyde-formic acid mixtures, the preferred conditions are about 70–125° C. for from 4 to 16 hours; whereas with most of the other agents it is customary to carry out the reaction at room temperature for from about 4 to 24 hours. When R represents lower alkanoyl and the reaction is carried out in the presence of an added base, it is preferred to use relatively low temperatures and to add the base in small portions as the reaction proceeds. The product is isolated either as the free base or as an acid-addition salt by adjustment of the pH as required.

Azetidine compounds required as starting materials in the foregoing process can be prepared by any of a variety of methods. For example, a lower alkyl ester of a 2-cyano-2-(m-alkoxyphenyl)acetic acid is reacted with an alkyl halide containing either 3 or 4 carbon atoms, in the presence of an alkali metal alkoxide. In this reaction the alkyl radical containing either 3 or 4 carbon atoms is introduced on the carbon atom substituted by the cyano group. The resulting lower alkyl ester of the 2-cyano-2-(m-alkoxyphenyl)alkanoic acid is hydrogenated with nickel catalyst to give a lower alkyl ester of 2-amino-methyl-2-(m-alkoxyphenyl)alkanoic acid. The latter compound is reacted with methylmagnesium iodide in ether and the product hydrolyzed to a 3-(m-alkoxyphenyl)-3-alkyl-2-azetidinone which is then reacted with lithium aluminum hydride and the product hydrolyzed to give a 3-(m-alkoxyphenyl)-3-alkylazetidine. For the preparation of other starting materials a 3-(m-alkoxyphenyl)-3-alkylazetidine is hydrolyzed with concentrated hydrobromic acid to 3-(m-hydroxyphenyl)-3-alkylazetidine and the latter compound is reacted with a lower alkanoic acid anhydride or halide to give a 3-(m-alkanoyloxyphenyl)-3-alkylazetidine.

Also in accordance with the invention, the phenols of the invention, that is, the compounds wherein R represents hydrogen, and salts thereof, can be produced by reacting a compound having in free base form the formula

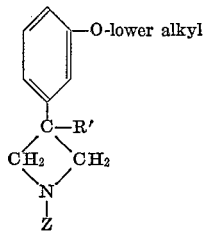

with an acidic reagent capable of cleaving the ether linkage; where R' and Z are as defined before. The treatment with an acidic reagent is followed, when necessary, by decomposition of an intermediate aluminum or boron complex which may be formed. Some examples of suitable acidic reagents are hydriodic acid, hydrobromic acid, hydrogen bromide in acetic acid, aluminum chloride in carbon disulfide, aluminum chloride in nitrobenzene, aluminum bromide in benzene, pyridine hydrochloride, and boron tribromide. The preferred acidic reagent is 48% (constant boiling) hydrobromic acid. With hydrobromic acid, it is preferred to use a large excess of this reagent as a solvent. An additional solvent is not necessary and the reaction is commonly carried out for from 1 to 3 hours at the reflux temperature. In the case of other acidic reagents, the reaction conditions are modified as necessary. For example, in the case of boron tribromide, it is convenient to carry out the reaction in an unreactive solvent such as a hydrocarbon or a halogenated hydrocarbon for from 15 minutes to 12 hours at a temperature of −60 to +50° C. The resulting product is formed as a boron complex which is then decomposed with a hydroxylic solvent such as methanol. In any case, the product is isolated directly as an acid-addition salt or, following adjustment of the pH as required, as the free base or as a phenolate salt.

Further in accordance with the invention, the esters of the invention, that is, the compounds wherein R represents lower alkanoyl, and salts thereof, can be produced by reacting an azetidine compound of the formula

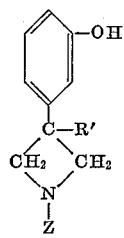

or a reactive derivative thereof, with a lower alkanoic acid or a reactive derivative thereof; where R' and Z are as defined before. Some examples of suitable reactive derivatives of the azetidine compound are the phenolate salts and acid-addition salts. Some examples of suitable reactive derivatives of the lower alkanoic acid are the acid halides and the acid anhydride. At least approximately the calculated amount and preferably an excess of the lower alkanoic acid or its reactive derivative is used. While the reaction can be run without an additional solvent, it is customary to employ an unreactive or compatible solvent. Some examples of suitable solvents are tertiary amines such as triethylamine, N,N-dimethylaniline, and pyridine; ethers such as diethyl ether and dioxane; hydrocarbons such as benzene and toluene; halogenated hydrocarbons such as ethylene chloride and chloroform; and tertiary amides such as dimethylformamide and N-methyl-2-pyrrolidone. A preferred solvent is diethyl ether. The reaction is optionally conducted in the presence of an acidic or basic catalyst. When the reactant is a lower alkanoic acid, a suitable catalyst is a mineral acid. When the reactant is an acid anhydride, a suitable catalyst is a tertiary amine. The time and temperature of the reaction are not critical but in general a higher temperature and a longer reaction time are used when a lower alkanoic acid is the reactant rather than one of its reactive derivatives. With an acid anhydride in ether it is preferred to carry out the reaction at reflux temperature for from 1 to 3 hours. The product is isolated either as the free base or as an acid-addition salt by adjustment of the pH as required.

The free bases of the invention form acid-addition salts with any of a variety of inorganic and organic acids. Pharmaceutically-acceptable acid-addition salts are formed by reaction with such acids as hydrochloric, hydrobromic, sulfuric, phosphoric, acetic, succinic, citric, maleic, and pamoic acids. The phenols of the invention also form phenolate salts with any of a variety of bases such as sodium hydroxide, potassium carbonate, and strongly-basic amines. The free bases and the salt forms are interconvertible by adjustment of the pH. They differ in solubility properties but in general are otherwise equivalent for the purposes of the invention.

The compounds of the invention are useful as pharmacological agents and as chemical intermediates. They are of particular value as analgesic agents because they have the ability to relieve severe pain without producing the side effects commonly associated with the use of alkaloidal analgesic agents. The compounds can be administered either orally or parenterally but oral administration is preferred. When studied in standard assay procedures, some of the compounds of the invention exhibit a higher degree of analgetic activity than codeine. The analgetic activities of the compounds of the invention can be quantitatively measured by a test described in Archives Internationales de Pharmacodynamie et de Therapie, 122, 301–311 (1959). This test is based on measurement of threshold mechanical pressures applied to the tails of rats required to elicit squeaking. Young, male, Sprague-Dawley albino rats are used. Following intraperitoneal administration of a test compound or reference compound, a uniformly increasing mechanical pressure is applied near the tip of the tail until squeaking occurs or until a certain arbitrary "cut-off" pressure is attained. The pressure is read at the time of squeaking. Treatments are actively randomized within "blocks" of animals and the operator is blind to individual treatments. The data obtained are subjected to statistical analysis in order to evaluate the analgetic potency of the test compound in relation to the analgetic potency of a reference compound, codeine phosphate. The test compounds are rated in terms of reciprocal milligram dose potency relative to codeine (base/base) which is a quantitative estimation of their analgetic potency relative to codeine, under the test conditions. By this procedure 1-methyl-3-(m-hydroxyphenyl)-3-propylazetidine was found to have a potency of 2.4; 1-methyl-3-(m-acetoxyphenyl)-3-propylazetidine was found to have a potency of 2.1; and 1-methyl-3-(m-hydroxyphenyl)-3-butylazetidine was found to have a potency of 3.0.

The invention is illustrated by the following examples.

EXAMPLE 1

A solution of 7.0 g. of 3-(m-methoxyphenyl)-3-propylazetidine in 17.5 ml. of formic acid and 7.0 ml. of 40% aqueous formaldehyde is heated at 95–100° C. for 8 hours. The mixture is cooled, stirred with 15 ml. of 4 N hydrochloric acid, and evaporated to dryness under reduced pressure. The residue is dissolved in water and the resulting solution is made basic with aqueous sodium hydroxide and extracted with ether. The ether extract is washed with water, dried, and evaporated to give a residue of 1-methyl-3-(m-methoxyphenyl)-3-propylazetidine. For purification this product is distilled in vacuo; B.P. 108–110° C. at 0.7 mm. The hydrochloride is obtained by dissolved the free base in ether and adding dry hydrogen chloride; M.P. 116–118° C. following crystallization from ethyl acetate-ether.

EXAMPLE 2

A mixture of 20.5 g. of 3-(m-methoxyphenyl)-3-propylazetidine, 18.5 g. of phenethyl bromide, 27.6 g. of potassium carbonate, and 100 ml. of dimethylformamide is stirred for 16 hours at room temperature. The mixture is poured onto crushed ice and extracted with ether. The ether extract is washed with water, dried, and evaporated to give a residue of 1-phenethyl-3-(m-methoxyphenyl)-3-propylazetidine. For purification, the product is distilled in vacuo; B.P. 174–178° C. at 0.5 mm. The hydrochloride is obtained by reacting the free base with hydrogen chloride in ether; M.P. 139–140° C.

EXAMPLE 3

A mixture of 5.0 g. of 1-methyl-3-(m-methoxyphenyl)-3-propylazetidine and 25 ml. of 48% hydrobromic acid is heated at reflux for 90 minutes. The mixture is evaporated under reduced pressure and the residue is dissolved in 25 ml. of water. The resulting aqueous solution is made basic with sodium bicarbonate and extracted with ether. The ether extract is washed with water, dried, and evaporated to give a residue of 1-methyl-3-(m-hydroxyphenyl)-3-propylazetidine; M.P. 147–148° C. following crystallization from methanol. A salt with citric acid is obtained by dissolving the free base and one equivalent of citric acid in acetone followed by concentrating the mixture.

EXAMPLE 4

A mixture of 15.5 g. of 1-phenethyl-3-(m-methoxyphenyl)-3-propylazetidine and 20 ml. of 48% hydrobromic acid is heated at reflux for 90 minutes and then evaporated under reduced pressure. The residue is dissolved in 25 ml. of water and the solution made basic with sodium bicarbonate and extracted with ether. The ether extract is washed with water, dried, and evaporated to give a residue of 1-phenethyl-3-(m-hydroxyphenyl)-3-propylazetidine. The hydrochloride, M.P. 70–73° C., is obtained by reacting the free base with dry hydrogen chloride in ether.

EXAMPLE 5

A solution of 5.9 g. of 1-methyl-3-(m-hydroxyphenyl)-3-propylazetidine and 6.1 ml. of acetic anhydride in 150 ml. of ether is heated at reflux for 2 hours. The mixture is evaporated under reduced pressure to give a residue of 1-methyl-3-(m-acetoxyphenyl)-3-propylazetidine. For purification, the product is distilled in vacuo; B.P. 123–124° C. at 0.8 mm.

By the foregoing procedure, with the substitution of an equivalent amount of propionic anhydride for the acetic anhydride, the product obtained is 1-methyl-3-(m-propionyloxyphenyl)-3-propylazetidine.

By the foregoing procedure, with the substitution of an equivalent amount of 1-phenethyl-3-(m-hydroxyphenyl)-3-propylazetidine for the 1-methyl-3-(m-hydroxyphenyl)-3-propylazetidine, the product obtained is 1-phenethyl-3-(m-acetoxyphenyl)-3-propylazetidine.

Each of the foregoing products is converted to a hydrochloride by reacting the free base with hydrogen chloride in ether.

EXAMPLE 6

A solution of 15 g. of 3-(m-methoxyphenyl)-3-butylazetidine in 41 ml. of 90% formic acid and 85 ml. of 40% aqueous formaldehyde is stirred and heated at reflux for 5 hours. The mixture is cooled, poured into 300 ml. of 2 N aqueous sodium carbonate and the pH adjusted to 8 with 10 N aqueous sodium hydroxide. The mixture is extracted with ether. The ether extract is washed with water, dried, and evaporated to give a residue of 1-methyl-3-(m-methoxyphenyl)-3-butylazetidine. For purification the product is distilled in vacuo; B.P. 113–114° C. at 0.8 mm. The hydrochloride is obtained by dissolving the free base in ether and adding dry hydrogen chloride; M.P. 120–121° C. following crystallization from isopropyl alcohol-ether.

EXAMPLE 7

Over a period of 15 minutes a solution of 4.0 ml. of boron tribromide in 10 ml. of methylene dichloride is added to a stirred solution of 4.0 g. of 1-methyl-3-(m-methoxyphenyl)-3-butylazetidine in 30 ml. of methylene dichloride at −60° C. The mixture is stirred for 1 hour at −60° C., then at 20–25° C. for 30 minutes. The mixture is cooled to −40° C., and then 20 ml. of methanol is added, and the resulting solution evaporated to dryness. The residue is dissolved in hot 5 N aqueous sodium hydroxide and carbon dioxide is passed into the solution until precipitation of product is complete. The mixture is cooled and the precipitated gummy product is dissolved by extracting with ether. The ether extract is evaporated to give a residue of 1-methyl-3-(m-hydroxyphenyl)-3-butylazetidine; M.P. 132–133° C. following crystallization from ethanol.

STARTING MATERIALS

With stirring, 126 g. of ethyl 2-cyano-2-(m-methoxyphenyl)acetate in 25 ml. of tertiary butanol is added to a chilled solution of potassium tertiary butoxide prepared from 22.5 g. of potassium in 500 ml. of tertiary butanol. The resulting thick suspension is stirred, 55 ml. of propyl bromide is added, and the mixture is held at 20° C. for 24 hours and then heated at reflux for 1 hour. The mixture is concentrated to a small volume by distillation under reduced pressure, adjusted to pH 6 with dilute acetic acid, and extracted with ether. The ether extract is dried, evaporated, and distilled in vacuo to give ethyl 2-cyano-2-(m-methoxyphenyl)valerate; B.P. 118–119° C. at 0.3 mm. A mixture of 26.1 g. of this product, 400 ml. of ethanol, and 10 g. of Raney nickel catalyst is shaken with hydrogen at 70° C. and 100 atmospheres pressure for 1 hour, or until absorption of hydrogen ceases. The mixture is cooled and filtered and the filtrate evaporated under reduced pressure to give a residue of ethyl 2-aminomethyl-2-(m-methoxyphenyl)valerate; B.P. 138–140° C. at 0.9 mm. A solution of 18.4 g. of this product in 50 ml. of ether is added to a cooled solution of methylmagnesium iodide prepared from 9.5 g. of magnesium and 38.3 g. of methyl iodide in 150 ml. of ether. The mixture is allowed to stand at room temperature for 3 days and then stirred with 50 ml. of 20% aqueous ammonium chloride solution containing 3 ml. of concentrated hydrochloric acid. The ether layer is separated, washed with water, dried, and evaporated to give a residue of 3-(m-methoxyphenyl)-3-propyl-2-azetidinone; B.P. 166–167° C. at 0.6 mm. With stirring at −20° C., a suspension of 8.6 g. of lithium aluminum hydride in 200 ml. of ether is added slowly to a solution of 13 g. of 3-(m-methoxyphenyl)-3-propyl-2-azetidinone in 100 ml. of ether. While stirring is continued, the mixture is allowed to warm to room temperature and then heated at reflux for 3 hours. It is then cooled to −5° C. and stirred with 100 ml. of saturated aqueous ammonium chloride solution. The ether phase is separated, washed with water, dried, and evaporated to give a residue of 3-(m-methoxyphenyl)-3-propylazetidine: B.P. 113–115° C. at 0.8 mm.

By the foregoing general procedures, starting with ethyl 2-cyano-2-(m-methoxyphenyl)acetate, but with the substitution of an equivalent amount of butyl bromide for the propyl bromide, the following additional compounds are obtained. Ethyl 2-cyano-2-(m-methoxyphenyl)caproate; B.P. 125–132° C. at 0.5 mm. Ethyl 2-aminomethyl-2-(m-methoxyphenyl)caproate; B.P. 152–154° C. at 1.2 mm. 3-(m-methoxyphenyl)-3-butyl-2-azetidinone;

B.P. 162° C. at 0.5 mm. 3-(m-methoxyphenyl)-3-butylazetidine; B.P. 134° C. at 1.5 mm.

We claim:
1. A member of the class consisting of compounds of the formula

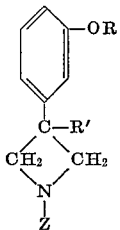

and salts thereof; where R is a member of the class consisting of hydrogen, lower alkyl, and lower alkanoyl; R' is alkyl of 3 or 4 carbon atoms; and Z is a member of the class consisting of methyl and phenethyl.

2. A compound according to claim 1 wherein R' is propyl.

3. A compound according to claim 1 which is 1-methyl-3-(m-hydroxyphenyl)-3-propylazetidine.

4. A compound according to claim 1 which is 1-methyl-3-(m-acetoxyphenyl)-3-propylazetidine.

5. A compound according to claim 1 which is 1-methyl-3-(m-hydroxyphenyl)-3-butylazetidine.

References Cited

Testa, Chemical Abstracts, vol. 56, pp. 7247–7248 (1962).

ALTON D. ROLLINS, Primary Examiner

U.S. Cl. X.R.

260—465, 471, 999